April 4, 1950 — A. T. SWEET — 2,502,490
REACTION AND STRATIFYING CONTAINER
Filed May 8, 1944
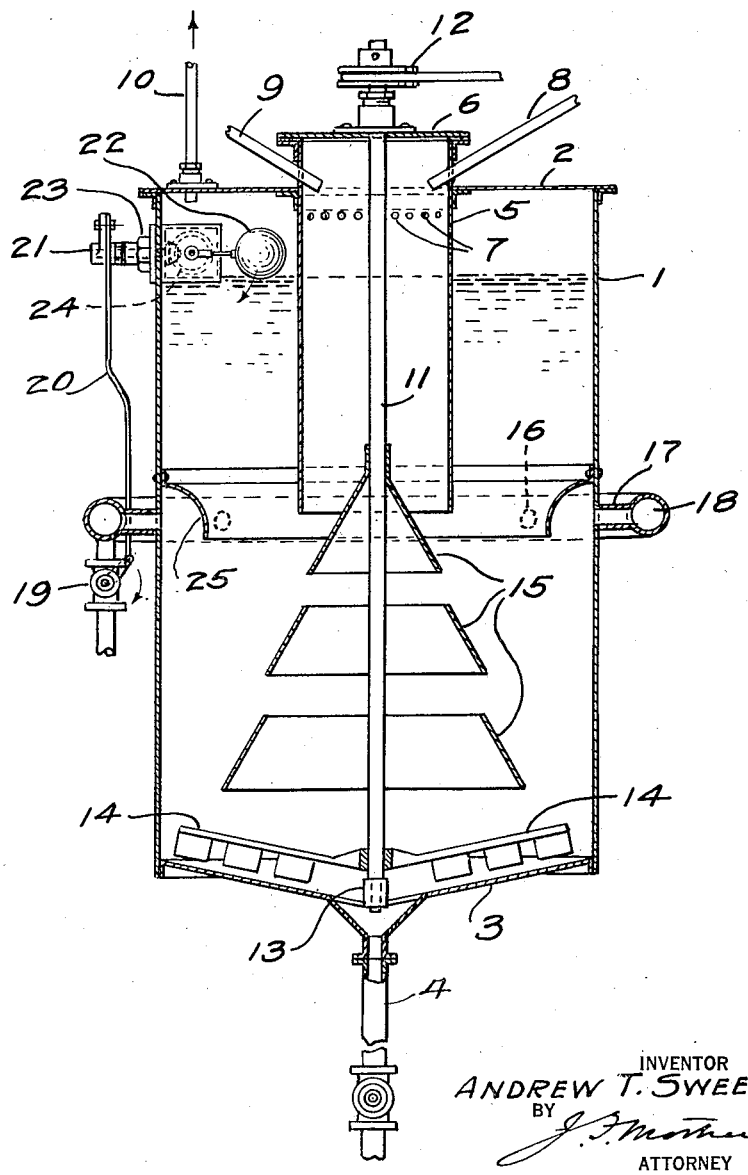
INVENTOR
ANDREW T. SWEET
BY
ATTORNEY Patented Apr. 4, 1950

2,502,490

UNITED STATES PATENT OFFICE 2,502,490

REACTION AND STRATIFYING CONTAINER

Andrew T. Sweet, Salt Lake City, Utah, assignor to the United States of America as represented by the Secretary of the Interior Application May 8, 1944, Serial No. 534,658

1 Claim. (Cl. 23—285)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to a method and apparatus for the production of non-gelatinous alumina by the treatment of alums with ammonium hydroxide, and provides a suitable stratifying digestion receptacle for the expeditious carrying out of this treatment step.

In the manufacture of alumina by processes in which alums are formed as an intermediate product, it is necessary to convert the alums to alumina, and this operation is usually carried out by treating the alums with strong aqueous ammonia. It has been found that a grainy, non-gelatinous alumina can be prepared from alums when the alums, either in solid or strongly concentrated solution form, are introduced into a relatively quiescent body of strong aqueous ammonia. Heretofore, great difficulties have been encountered in this conversion step by virtue of the tendency of the alumina to precipitate in a gelatinous state which is extremely difficult to filter, wash, and handle in the subsequent treatment steps. For instance, in order to produce granular alumina pseudomorphous with the alum crystals from which it is made, it has heretofore been thought necessary to treat the alum crystals on a complicated belt form apparatus such as is illustrated in U. S. Patent No. 2,036,508, issued on April 7, 1936, to Svend S. Svensen. It has now been found that alumina can be produced in the form of an alum pseudomorphs by treating solid alum crystals with ammonia in accordance with this invention.

Through the instrumentality of a novel apparatus, the invention contemplates the conversion of alums to alumina having a granular structure pseudomorphous with the initial alums undergoing treatment, and includes also a stratifying chemical digestion method adapted to a wide variety of chemical treatment operations. Other objects and advantages will be apparent and will appear hereinafter.

These objects are accomplished in accordance with this invention which comprises the method, means, combination and arrangement of parts hereinafter set forth taken in conjunction with the accompanying drawing.

Suitable apparatus to accomplish the purposes of this invention is illustrated in the accompanying drawing wherein the structure is shown principally as a sectional view.

For a practical embodiment of this invention, and referring to the drawing forming a part hereof, there is provided a closed elongated vessel 1 adapted to hold a quiescent body of liquid. The vessel is provided with a suitable closely fitted cover 2 and a bottom plate 3 which preferably slopes toward a solids outlet 4. Centrally positioned in the cover 2 and depending therefrom is an annular baffle 5 having a closely fitting cover 6. The annular baffle 5 is provided with a plurality of passageways 7 for equalizing the vapor pressure inside the baffle 5 and inside the vessel 1. Near the top of the annular baffle 5 are located a solids inlet 8 for admitting solid feed material and a liquid inlet 9 for admitting liquid feed material. A vent 10 is located near the top of the vessel 1 for discharging evolved vapors from the body of quiescent liquid contained in the vessel 1. In the cover 6 of the annular baffle 5 is journaled a shaft 11 driven through a pulley 12 from any suitable source of power not shown. The shaft 11 extends throughout the length of the vessel 1 and is similarly journaled in a bracket 13 near the base of the vessel 1. Closely adjacent the bottom 3 of the vessel 1 are a series of rake arms 14 driven by the shaft 11 and adapted to scrape sedimentary deposits on the bottom 3 of the vessel 1 and direct them toward the solids outlet 4. Also carried by the shaft 11 are a series of deflecting vanes 15 which may be of conical or frustro-conical shape mounted coaxially with the shaft below the annular baffle 5 and adapted to cause falling solids discharged from the upper portion of the vessel 1 to travel an extended path through the quiescent liquid body toward the periphery of the vessel 1. Circumferentially located around the periphery of the vessel 1 and substantially below the normal liquid level are a plurality of liquid outlets 16 for withdrawing weakened or spent liquid. The outlets 16 communicate through short conduits 17 with a toroidal manifold 18 which in turn discharges the weakened liquors through a float controlled valve 19. The valve 19 is actuated automatically by means of a rod 20 and a bell crank 21, and this bell crank 21 is shown connected with a float 22 through a packing gland 23 and a rack and pinion gear 24.

Closely above the liquid outlets 16 and overhanging them is shown a circumferential member 25 projecting inwardly in arcuate form from the vessel's inner wall. The member 25 shields the liquid outlets 16 from falling solids and also serves the multiple function of causing discharged liquids to emanate from the lower portion of the vessel 1 rather than the upper, and further tends to maintain the liquid contents of the vessel 1 in a quiescent state.

In operation, the vessel 1 is filled with strong aqueous ammonia and thereafter the feed ammonia is fed through the liquid inlet 9 preferably in continous manner and the liquid level is maintained constant in the vessel 1 by virtue of the float 22 actuating the float controlled valve 19. The shaft 11 is very slowly rotated at, say 3 to 4 revolutions per minute, in order that the rake arms 14 will cause precipitating solids to be discharged through the solids discharge 4 at the central part of the vessel bottom 3. Alum to be reacted is introduced into the vessel 1 by means of the solids inlet 8 into the inner portion of the annular baffle 5 where it immediately contacts the strong aqueous ammonia feed introduced into the inlet 9. As the alum particles settle and leave the initial reaction zone on the interior of annular baffle 5, they are deflected outwardly toward the periphery of the vessel 1 by means of the deflecting vanes 15, thus traveling an extended path through the body of quiescent liquid. As the falling particles settle to the bottom 3 of the vessel 1 they are raked inwardly to the central solids discharge 4 by means of rake arms 14 with a minimum of disturbance to the body of quiescent liquid.

Weakened aqueous ammonia or other treatment liquid is withdrawn through the outlets 16 into the manifold 18 and thence discharged for further working up through the float controlled valve 19. The arcuate circumferential shield and baffle 25 causes the discharged liquid to be taken from the zone of minimum concentration because of the fact that weak aqueous ammonia is more dense than strong aqueous ammonia. Therefore, the weakened aqueous ammonia together with accompanying soluble materials such as for example ammonium sulfate produced in the reaction of ammonia with alums, is withdrawn in a simple and expeditious manner.

While the invention has been described with reference to a preferred embodiment thereof, it will be apparent that numerous modifications can be made therein. For example, a concentrated aqueous solution of alum to be converted can be admitted through the inlet 8 instead of a solid feed. While the passageways 7 have been illustrated as a series of drill holes, it is entirely feasible to make the passageways in the form of a slot (not shown) or other opening to equalize the pressure between the inner and outer portions of the annular baffle. While the deflecting vanes 15 have been shown as conical and frustroconical in shape, they can alternatively be made in any other suitable shape to cause the precipitating solids to travel an extended path through the treatment liquor. While any of the usual materials of construction resistant to aqueous ammonia and alum solutions can be employed, the apparatus is preferably made of ferrous alloys of chromium, nickel and the like which possess an enhanced corrosion resistance. While the invention has been described with reference to operation at atmospheric or moderately increased pressure, it is apparent that the apparatus may be employed at elevated or reduced pressures with equal facility, depending only on the strength of usual materials of construction.

The apparatus in accordance with this invention is especially applicable to continuous operation and thus possesses numerous advantages over devices which can only be employed for batch operation. For example, the strong aqueous ammonia and the alum feed, either in solid or liquid form, can be continuously fed to the apparatus, the spent ammonia together with dissolved salts is continuously withdrawn through the liquid discharge outlets, and the granular alumina is continuously withdrawn through the solids discharge.

A salient advantage of the apparatus in accordance with this invention where a solid alum feed is employed, is that the alumina produced is in the form of pseudomorphs of the original alum crystals.

If desired, the annular baffle 5 can be extended substantially beyond the cover 2 of the vessel 1 to allow the alum feed to fall a considerable distance in a vapor atmosphere saturated with ammonia. Another alternative arrangement is to fit the liquid ammonia inlet 9 with a spray nozzle (not shown) and admit feed ammonia in the form of a fine spray in order to admix it with the feed alum being introduced. Suitably, both the liquid inlet 9 and the inlet 8 can be mounted tangential to the annular baffle 5 so as to produce a whirling motion before the feed substances reach the body of quiescent liquid in the vessel.

Many other various changes and modifications will occur to one skilled in the art, and therefore the invention is not limited to the specific details and procedures outlined.

What is claimed is:

In chemical apparatus adapted to the continuous conversion of alum into pseudomorphous alumina by reaction with quiescent aqueous ammonia, the combination with an elongated closed receptacle adapted to hold a quiescent body of liquid therein, of a coaxial annular baffle in the upper portion of said receptacle extending therefrom and below the normal liquid level, said baffle being closed at its upper end and being of small diameter relative to said receptacle, said baffle having a plurality of radially-extending passageways in said receptacle above said normal liquid level for equalizing vapor pressure in said receptacle and in said baffle, an inlet near the top of said baffle communicating therewith for introducing alum crystals into said receptacle via said baffle, a second inlet near the top of said baffle communicating therewith for introducing ammonia into said receptacle via said baffle, whereby the introduction of reactants into said receptacle via said baffle does not substantially disturb the quiescent condition of the main liquid body in said receptacle, a centrally-positioned conduit in the bottom of said receptacle for removing and discharging formed alumina therefrom, a rake device for directing solids collecting on the bottom of said receptacle toward said solids outlet, said rake device comprising an axially-disposed rotary shaft carrying near its lower end a plurality of radially-disposed rake arms, and a liquid discharge device near the middle of said elongated receptacle, said liquid discharge device being adapted to the continuous removal of spent ammonia liquor and dissolved byproducts from said receptacle near its midpoint while continuously maintaining a deep strata of strong ammonia precipitating liquor above the zone of liquid removal, said liquid discharge device comprising a plurality of radially-disposed outlet conduits communicating with said receptacle near its midpoint, a circumferential baffle disposed about the inner periphery of said receptacle overhanging said liquid outlet conduits to prevent withdrawal of falling solids therethrough, a toroidal manifold embracing said receptacle and communicating with said liquid outlet conduits, and a valved outlet on said manifold connected to and actuated by a float in said receptacle to maintain a predetermined liquid level in said receptacle.

ANDREW T. SWEET.

REFERENCES CITED

The following references are of record in the file of this patent:

UNITED STATES PATENTS

| Number | Name | Date |
|---|---|---|
| 1,152,693 | Barton et al. | Sept. 7, 1915 |
| 1,229,190 | Deperu | June 5, 1917 |
| 1,889,080 | Svendsen | Nov. 29, 1932 |
| 2,000,939 | Fleischer | May 14, 1935 |
| 2,111,788 | Krchma | Mar. 22, 1938 |
| 2,195,273 | Everson | Mar. 26, 1940 |
| 2,356,547 | Tiedemann | Aug. 22, 1944 |
| 2,366,898 | Gurney | Jan. 9, 1945 |
| 2,368,354 | Green | Jan. 30, 1945 |